United States Patent [19]

Romano, Jr.

[11] 3,968,949

[45] July 13, 1976

[54] PROJECTOR TILT MECHANISM

[75] Inventor: Frank A. Romano, Jr., Syracuse, N.Y.

[73] Assignee: General Electric Company, Portsmouth, Va.

[22] Filed: July 18, 1974

[21] Appl. No.: 489,759

[52] U.S. Cl............................. 248/11; 248/397; 248/188.4
[51] Int. Cl.²........................................ F16F 15/00
[58] Field of Search ......... 248/11, 23, 188.2, 188.4, 248/184, 185, 186, 371, 397; 74/89.15

[56] References Cited
UNITED STATES PATENTS

| | | | |
|---|---|---|---|
| 2,662,708 | 12/1953 | Schmitt | 248/23 |
| 2,696,961 | 12/1954 | Fox | 248/11 |
| 2,842,982 | 7/1958 | Holdener | 74/89.15 |
| 3,071,887 | 1/1963 | Von Arb | 248/23 |
| 3,668,940 | 6/1972 | Avena et al. | 74/89.15 |
| 3,750,989 | 8/1973 | Bergeson | 248/188.4 |

FOREIGN PATENTS OR APPLICATIONS

| | | | |
|---|---|---|---|
| 113,202 | 1/1926 | Belgium | 248/11 |
| 2,423 | 1886 | United Kingdom | 248/185 |

Primary Examiner—Roy D. Frazier
Assistant Examiner—Robert A. Hafer

[57] ABSTRACT

A projector tilt mechanism includes a base about which a load-carrying platform is rotated in a vertical plane. A threaded shaft is rotatably coupled to the platform by radial thrust bearings and to the base by threaded fittings. Lost motion in the rotational system is avoided by properly positioning and locking in place two threaded nuts along the shaft at either side of the threaded connection to the base, and by using threaded locking collars tightened against the outermost thrust bearing faces. Rotation of the shaft produces relative rotation of the platform and base, causing the base to raise the front or rear of the projector above a flat surface or, if the base is affixed to a pedestal, causing a direct change in platform pitch.

18 Claims, 6 Drawing Figures

U.S. Patent  July 13, 1976  Sheet 1 of 2  3,968,949
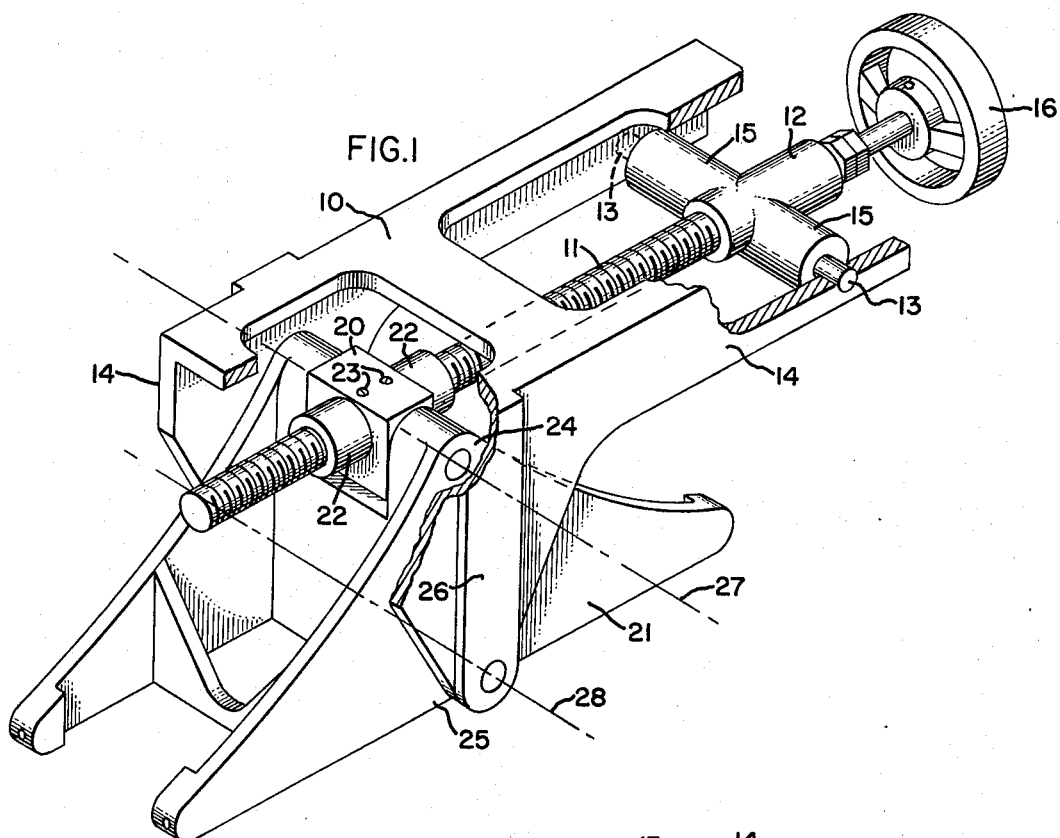
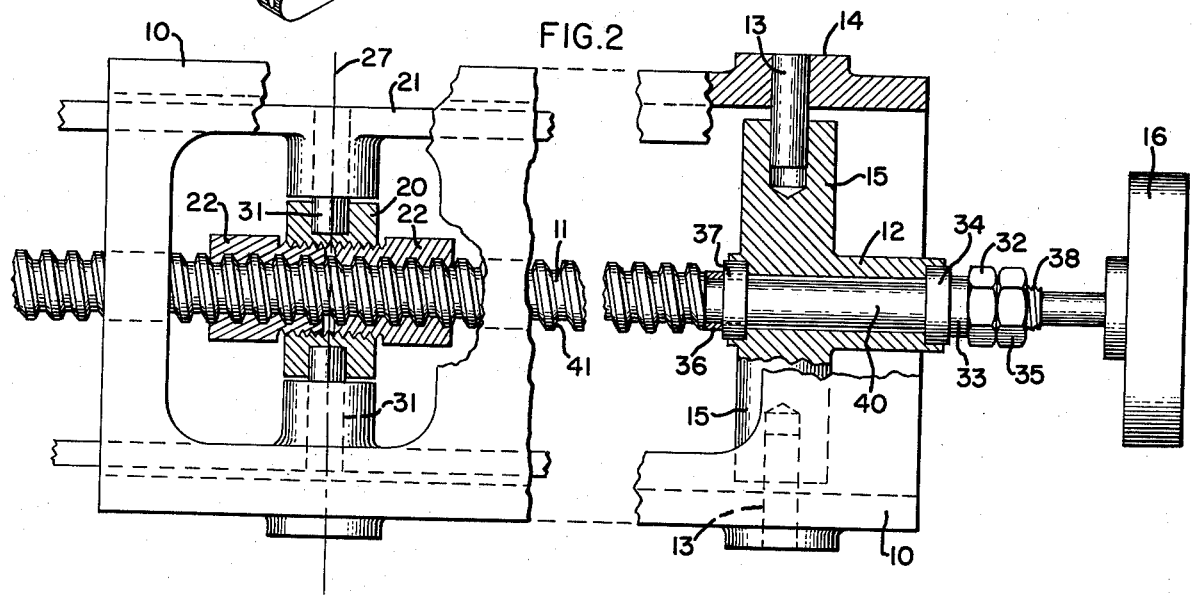

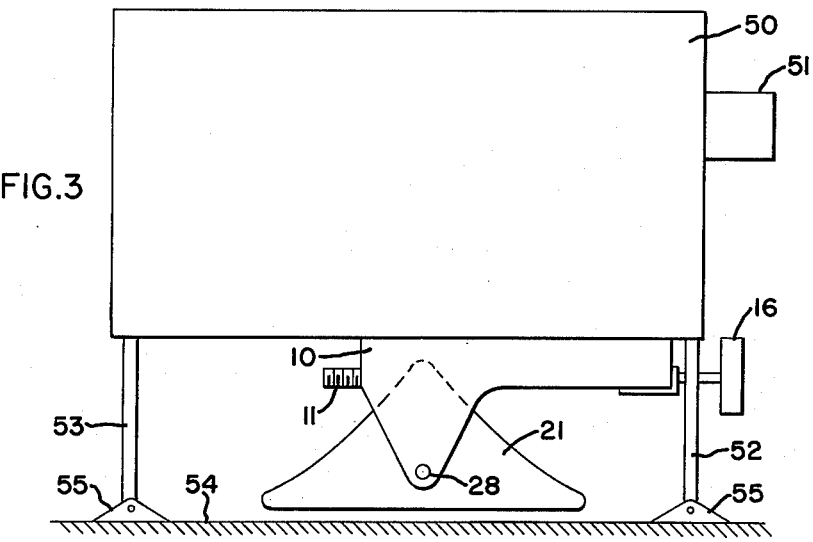
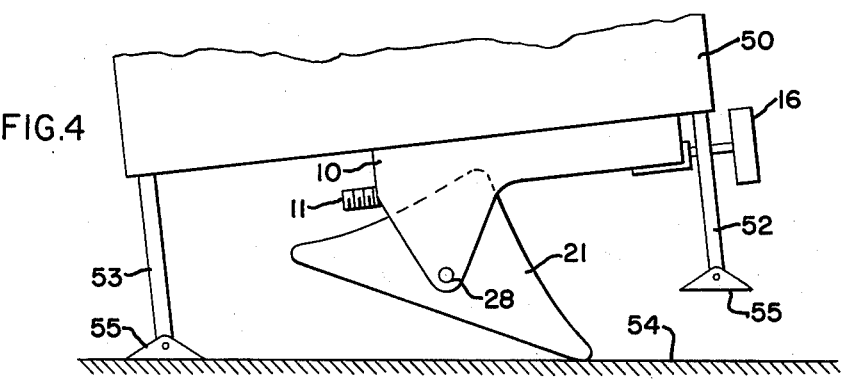
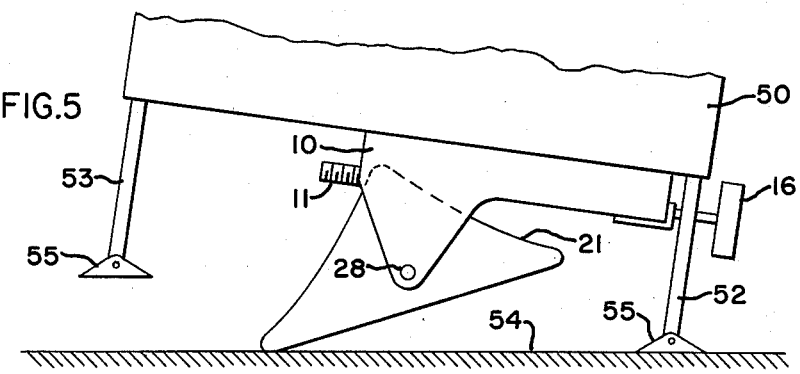
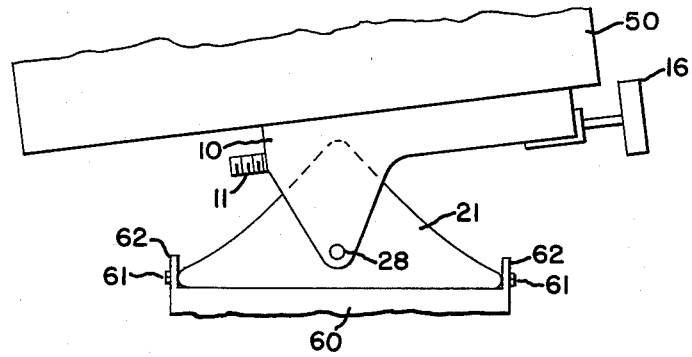

PROJECTOR TILT MECHANISM

INTRODUCTION

This invention relates to load positioning apparatus, and more particularly to a mechanism for supporting a video projector with precisely adjustable pitch or front-to-rear tilt.

Sophisticated, compact video projectors, such as model PJ 5000 available from General Electric Company, Syracuse, N.Y., include a light valve, operating circuitry, and associated apparatus within a common enclosure. The weight of the enclosure is generally greater than that of conventional motion picture projectors; for example, the General Electric PJ 5000 projector weighs approximately 125 pounds. When the unit is placed into operation at any selected location, it is necessary that the displayed image be properly positioned in the desired area on the display screen. Because the relative height of projector and screen vary from location to location when the apparatus is employed at different locations, it is necessary to provide the projector with a tilt mechanism that can adjust the projector pitch so as to raise or lower the displayed image quickly, precisely, and with minimal effort. Because of the heavier weight of a video projector, conventional motion picture projector tilt mechanisms are too flimsy to provide this type of service. Moreover, because there is no tape or film that can be rewound and restarted if video projectors displaying live or broadcast signals should direct images for any length of time outside of the desired zone on the screen, it is essential that the tilt mechanism be stable, so that the picture, once produced in the desired area of the screen, will remain in that area until the pitch of the projector is intentionally readjusted or the entire projector repositioned at some other location. The present invention is directed to apparatus of this type.

Accordingly, one object of the invention is to provide a stable projector tilt mechanism that is smoothly and precisely positionable.

Another object is to provide a rapidly adjustable load tilting mechanism which exhibits a large mechanical advantage.

Another object is to provide a projector tilt mechanism operable on either a flat surface or a pedestal.

Briefly, in accordance with a preferred embodiment of the invention, a mechanism having a platform for tilting a load carried on the platform comprises a threaded shaft and support means engaging the shaft. The support means are coupled to the platform so as to maintain the platform generally at a predetermined position with respect to the shaft. Threaded means are pivotally mounted at a first location on a base so as to be free to rotate through a vertical plane. The threaded means engage the threaded shaft and are rotatable relative to each other. The platform is pivotally mounted at a second location upon the base, spaced apart from the first location so as to be free to rotate through a vertical plane.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIG. 1 is a partially broken-away perspective view of apparatus embodying the invention;

FIG. 2 is a partially broken-away top view of a portion of the apparatus embodying the invention;

FIG. 3 is a side view of the apparatus embodying the invention, when used in conjunction with a projector, supported on a flat surface;

FIGS. 4 and 5 are side views of the apparatus embodying the invention, when used to tilt a projector upward or downward, respectively, on a flat surface; and FIG. 6 is a side view of the apparatus embodying the invention, when used in conjunction with a projector, supported on a pedestal.

DESCRIPTION OF TYPICAL EMBODIMENTS

FIG. 1 illustrates apparatus embodying the invention, which includes a platform or frame 10 on which a load, such as a video projector, is to be carried. A shaft 11, threaded over most of its length, is coupled to platform 10 through a tee-shaped bushing 12, by pins 13 passing through apertures in either skirt 14 of platform 10 and into solid rod portions 15 on either side of the tee-shaped bushing. Platform 10 is thus maintained generally at a predetermined position with respect to shaft 11, though pins 13 are free to pivot within the apertures in platform skirt 14. The portion of shaft 11 extending outward from platform 10 beyond bushing 12 is terminated in rotatable means which may be motor driven or manually driven. A knob 16 is provided where manual drive is preferred.

An internally threaded block 20 is pivotally mounted at the apex region 24 of a generally triangularly shaped base 21. A pair of nuts 22 are attached by external threads (visible in FIG. 2), to block 20, and allow shaft 11 to rotate within internal threads (visible in FIG. 2). Nuts 22, when properly positioned, are affixed in place by set screws 22 passing through block 20. A strengthening rib 26 on skirt region 14 of platform 10 is pivotally attached to base 21 near the lowermost portion 25 of the base. Conveniently, block 20 and platform 10 pivot about axes 27 and 28, respectively.

In operation, rotation of shaft 11 serves to rotate frame 10 about axis 28 through a vertical plane orthogonal to axis 28. Rotation of knob 16 in one direction, e.g., clockwise, tends to shorten the distance between block 20 and tee-shaped bushing 12, causing platform 10 to pivot about axis 28 such that the end of platform 10 closest to knob 16 moves away from the portion of base 21 beneath that region of platform 10. Similarly, rotation of knob 16 in the opposite direction tends to lengthen the distance between block 20 and tee-shaped bushing 12, causing platform 10 to pivot about axis 28 such that the end of platform 10 closest to knob 16 moves toward the portion of base 21 beneath that region of platform 10. In either case, shaft 11 moves approximately in unison with platform 10 at tee-shaped bushing 12, pivoting about axis 27. Bushing 12, however, pivots slightly about pins 13 as the tilt mechanism pitch changes, since platform 10 and shaft 11 pivot on different centers. Nevertheless, shaft 11 and platform 10 move through the same or parallel vertical planes when the platform is rotated about axis 28. Because the interaction of the threads on shaft 11 with the internal threads of nuts 22 is essentially that of a worm gear, a large mechanical advantage in rotating platform 10 with respect to base 21 is obtained. Moreover, by appropriate worm gear ratios, an optimum balance may be selected between mechanical advantage and degree of pitch change for any given amount of rotation of shaft 11, so that adequate speed of positioning need not be sacrificed for a large mechanical advantage.

In the event it is desired to drive shaft 11 by means of a motor, the mechanism by which shaft 11 moves longitudinally through block 20 may comprise a recirculating ball nut and shaft. This provides an extremely low friction coefficient, making the rotational system highly efficient. In such case, however, it may be necessary to clamp the shaft to keep it in position since the weight of the load, when raised, may cause the shaft to rotate and lower itself. If the motor is electrically driven, it may be convenient to employ a solenoid-operated clamp to retain the tilt mechanism in its desired position.

FIG. 2 illustrates in detail the portion of the apparatus of FIG. 1 responsible for preventing lost motion in the rotational system. Lost motion is prevented in block 20 by use of nuts 22 on either side of the block. One of nuts 22 is first locked in place using its associated set screw 23, shown in FIG. 1, and then the other of nuts 22 is screwed tightly along shaft 11 toward the locked nut 22 and locked in place with the other of set screws 23. Inwardly directed pressures on the threads of shaft 11 are thus applied by nuts 22, which remain stationary with respect to block 20 and prevent axial displacement of shaft 11 without accompanying shaft rotation. FIG. 2 also shows a pair of pins 31 centered along axis 27 and extending through apertures on either side of base 21 into block 20 to permit rotation of block 20 about axis 27.

At the free end of platform 10, an unthreaded portion 40 of shaft 11 passes through tee-shaped bushing 12, terminating at knob 16. A hexagonal nut 32 is fastened on a short threaded region 38 of shaft 11 against a thrust collar 33 which, in turn, bears against the outer face of a radial thrust bearing 34. A second hexagonal nut 35 is locked against nut 32 on threaded region 38 of shaft 11 to prevent nut 32 from becoming loosened. The inner face of thrust bearing 34 abuts tee-shaped bushing 12. At the opposite end of bushing 12, a thrust collar 36 is forced against a radial thrust bearing 37 by the end of the lengthy threaded portion 41 of shaft 11, and the inner face of thrust bearing 37 thus bears against bushing 12. Consequently, shaft 11 is free to rotate in bushing 12, but is prevented from axial displacement therein. FIG. 2 also shows pins 13 passed through apertures in skirt 14 of platform 10 and into solid rod portions 15 on either side of tee-shaped bushing 12.

FIGS. 3–5 illustrate operation of the invention in conjunction with a video projector 50 as the load mounted thereon, and are described accordingly, although the load may be any apparatus for which a precise tilt is desired, limited only by the user's ingenuity. In FIG. 3, projector 50 having a lens 51 from which optical images are projected, is illustrated as supported on a pair of front legs 52 (only one of which is visible) and a pair of rear legs 53 (only one of which is visible) standing on a flat surface 54, such as a tabletop. Each leg is terminated in a pad 55 free to swivel about the bottom of the respective leg to which it is attached.

As shown in FIG. 3, the bottom of projector 50 is fastened to platform 10 of the tilt mechanism such that base 21 is raised entirely above the surface of table 54, knob 16 having been adjusted to maintain base 21 approximately parallel to the surface of table 54. If knob 16 is thereafter rotated, as in a clockwise direction, threaded shaft 11 draws block 20, shown in FIGS. 1 and 2, in a direction toward knob 16, in turn drawing the apex region of base 21 toward knob 16. Thus platform 10 and base 21 rotate with respect to each other about pivot axis 28, positioning the projector as illustrated in FIG. 4 whereby the front portion of base 21 bears against surface 54 and raises the front portion of platform 10. Consequently the front portion of projector 50 is raised, and pads 55 attached to front legs 52 are lifted entirely off of surface 54. This leaves the projector supported by its rear legs and the tilt mechanism, and the displayed images are elevated above those that would be produced when the projector is situated as illustrated in FIG. 3. Similarly, if knob 16 should be rotated in the opposite direction, threaded shaft 11 pushes block 20, shown in FIGS. 1 and 2, in a direction away from knob 16, in turn pushing the apex region of the base away from knob 16. Platform 10 and base 21 again rotate with respect to each other about pivot axis 28, positioning the projector as illustrated in FIG. 5 whereby the rear portion of base 21 bears against surface 54 and raises the rear portion of platform 10. Consequently the rear portion of projector 50 is raised, and pads 55 attached to rear legs 53 are lifted entirely off of surface 54. This leaves the projector supported by its front legs and the tilt mechanism, and the displayed images are lowered below those that would be produced when the projector is situated as illustrated in FIG. 3.

In FIG. 6, projector 50 is shown fastened to platform 10 of the tilt mechanism, with base 21 being rigidly fastened at its front and rear portions to a pedestal 60, as by screws 61 passing through upright portions 62 of the pedestal and penetrating into base 21. When the projector is operated in this fashion, legs 52 and 53 shown in FIGS. 3–5 are unnecessary since the projector is continuously supported by the tilt mechanism only. As in the case of FIGS. 3–5, if knob 16 is rotated, as in a clockwise direction, threaded shaft 11 draws block 20, shown in FIGS. 1 and 2, in a direction toward knob 16, in turn tending to pull the apex region of base 21 toward knob 16. Since the base is fastened to pedestal 60, however, it cannot move. Therefore, the end of platform 10 at which knob 16 is located tends to rise, due to relative rotation of platform 10 about pivot axis 28, and the image produced by projector 50 is elevated. Similarly, if knob 16 is rotated in the opposite direction, threaded shaft 11 forces block 20, shown in FIGS. 1 and 2, in a direction away from knob 16, in turn tending to push the apex region of base 21 away from knob 16. However, since the base is fastened to pedestal 60, the end of platform 10 at which knob 16 is located is lowered, due to relative rotation of platform 10 about pivot axis 28. Consequently, images produced by projector 50 are thereby lowered.

Whether the projector is table-mounted, as shown in FIGS. 3–5, or pedestal-mounted, as shown in FIG. 6, lost motion in block 20 and end play of shaft 11 at bushing 12 can be especially detrimental to achieving precise tilt of the load on platform 10 when the center of gravity of the gross load approaches dead center and then goes over center in either forward or rear tilt. In this instance, dead center lies on a vertical plane containing axis 28. Jacking, or erratic motion, is most noticeable when the projector is pedestal-mounted since, even when the center of gravity of the gross load is at dead center, the load is entirely supported by the tilt mechanism unlike the table-mounted configuration shown in FIGS. 3–5. By substantially eliminating lost motion in the rotational system, the aforementioned erratic motion of the load may be avoided.

The foregoing describes a stable, load-carrying tilt mechanism that is smoothly and precisely positionable. The tilt mechanism, which may support a projector, is rapidly adjustable and exhibits a large mechanical advantage. The tilt mechanism may be operated on either a flat surface or a pedestal.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

I claim:

1. A mechanism having a platform for tilting a load carried on said platform, comprising:
   a threaded shaft;
   support means engaging said shaft and coupled to said platform so as to maintain said platform generally at a predetermined position with respect to said shaft;
   a base, having first and second ends, said base being pivotable about said first end thereof for affecting movement of said platform in a first direction, said base being pivotable about said second end thereof for affecting movement of said platform in a second direction, said base pivoting responsive to the rotation of said shaft; and
   threaded means pivotably mounted about an axis at a first location upon said base so as to be free to rotate through a first plane substantially orthogonal to said axis, said threaded means engaging said threaded shaft, said threaded means and said threaded shaft being rotatable relative to each other,
   said platform being pivotally mounted at a second location upon said base, spaced apart from said first location so as to be free to rotate through a second plane substantially parallel to said first plane.

2. The mechanism of claim 1 wherein said shaft is relatively rotatable with respect to said support means.

3. The apparatus of claim 1 wherein said platform is situated above said threaded shaft, and said second location on said base is located below said first location on said base.

4. The apparatus of claim 2 wherein said platform is situated above said threaded shaft, and said second location on said base is located below said first location on said base.

5. The apparatus of claim 2 including means coupled to one end of said threaded shaft for imparting rotational motion to said shaft.

6. The apparatus of claim 4 including means coupled to one end of said threaded shaft for imparting rotational motion to said shaft.

7. The apparatus of claim 1 wherein said threaded means comprises two threaded fittings, each fitting being separately positionable along said shaft to minimize lost motion between said threaded means and said shaft.

8. The apparatus of claim 2 wherein said threaded means comprises two threaded fittings, each fitting being separately positionable along said shaft to minimize lost motion between said threaded means and said shaft.

9. The apparatus of claim 6 wherein said threaded means comprises two threaded fittings, each fitting being separately positionable along said shaft to minimize lost motion between said threaded means and said shaft.

10. The apparatus of claim 9 including means affixed to said shaft on either side of said support means, and thrust bearings situated between said support means and each of said means affixed to said shaft, said thrust bearings being urged against said support means on either side thereof by said means affixed to said shaft on either side of said support means, respectively.

11. A projector tilt mechanism having a frame for supporting a projector thereon with selectable pitch, comprising:
    a threaded shaft rotatable about its longitudinal axis;
    support means coupling said shaft to said frame so as to maintain said frame generally at a predetermined position with respect to said shaft, said shaft being free to rotate with respect to said support means;
    a base, having first and second ends, said base being pivotable about said first end thereof for affecting movement of said frame in a first direction, said base being pivotable about said second end thereof for affecting movement of said frame in a second direction, said base pivoting responsive to the rotation of said shaft; and
    threaded means pivotally mounted about an axis at a first location upon said base so as to be free to rotate through a plane substantially orthogonal to said axis, said threaded means engaging said threaded shaft,
    said frame being pivotally mounted at a second location upon said base, spaced vertically apart from said first location so as to be free to rotate through a second plane.

12. The apparatus of claim 11 wherein said frame is situated above said threaded shaft and said second location on said base is located below said first location on said base.

13. The apparatus of claim 12 including means coupled to one end of said threaded shaft for imparting rotational motion to said shaft.

14. The apparatus of claim 11 wherein said threaded means comprises two threaded fittings, each fitting being separately positionable along said shaft to minimize lost motion between said threaded means and said shaft.

15. The apparatus of claim 13 wherein said threaded means comprises two threaded fittings, each fitting being separately positionable along said shaft to minimize lost motion between said threaded means and said shaft.

16. The apparatus of claim 15 including means affixed to said shaft on either side of said support means, and thrust bearings on said shaft situated between said support means and each of said means affixed to said shaft, said thrust bearings being urged against said support means on either side thereof by said means affixed to said shaft on either side of said support means, respectively.

17. The apparatus of claim 10, further including means for holding said base in a fixed position, whereby said base independently supports and tilts said platform about said second location.

18. The apparatus of claim 16, further including means for holding said base in a fixed position, whereby said base independently supports and tilts said frame about said second location.

* * * * *